Figure 1:
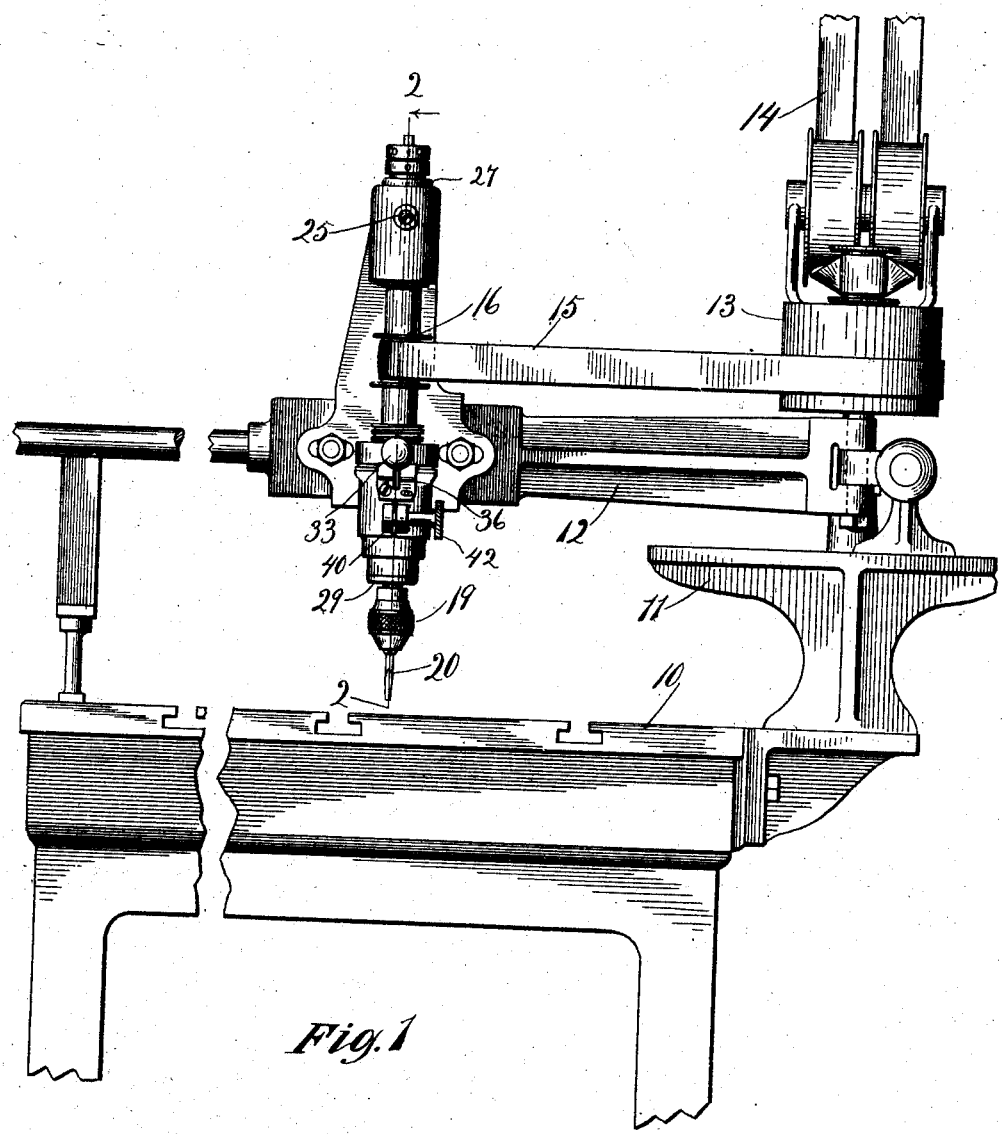

No. 864,986. PATENTED SEPT. 3, 1907.
J. A. PEARSON.
ROUTER HEAD.
APPLICATION FILED JAN. 18, 1907.
2 SHEETS—SHEET 2.
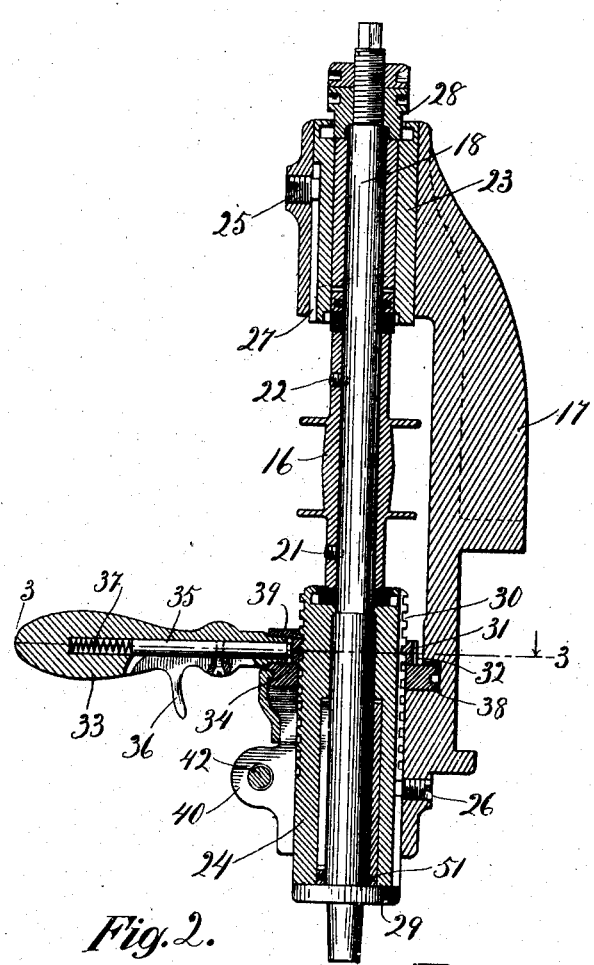
Fig. 2.
Fig. 4.
Fig. 5.
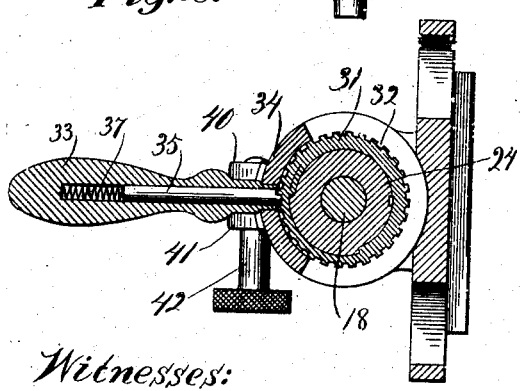
Fig. 3.
Witnesses:
W. H. Cotton
E. M. Klatcher
Inventor,
John A. Pearson
By Louis K. Gilson
Att'y.

UNITED STATES PATENT OFFICE.

JOHN A. PEARSON, OF CHICAGO, ILLINOIS.

ROUTER-HEAD.

No. 864,986.   Specification of Letters Patent.   Patented Sept. 3, 1907.

Application filed January 18, 1907. Serial No. 352,907.

*To all whom it may concern:*

Be it known that I, JOHN A. PEARSON, a citizen of the United States, and a resident of Chicago, county of Cook, and State of Illinois, have invented certain new and useful Improvements in Router-Heads, of which the following is a specification, and which are illustrated in the accompanying drawings, forming a part thereof.

The invention relates to devices for routing electro-types and similar printing forms, its object being to simplify the construction and improve the efficiency of devices of this kind; the invention consisting in the parts and arrangement of parts as hereinafter described and which are illustrated in the accompanying drawings, in which Figure 1 is a detail of a routing machine provided with my improved head; Fig. 2 is a sectional view on the line 2—2 of Fig. 1; Fig. 3 is a sectional view on the line 3—3 of Fig. 2; and Figs. 4 and 5 are details of the spindle bearings.

While the invention relates to the head, there is shown a detail of the entire machine comprising the stand 10, the bracket 11 rising therefrom, the swinging bracket-arm 12 mounted upon the bracket 11 and carrying the router head, and a pulley 13, which may be driven by a belt 14, and which drives the spindle head through the medium of a belt 15 and a pulley 16 mounted on the spindle.

The parts thus far enumerated are, generally speaking, common to routing machines in general use.

The head comprises a frame 17, carried by the bracket-arm 12 and supporting upper and lower boxes within which is journaled the spindle 18, carrying at its lower end the chuck 19 for holding the routing tool
20. The pulley 16 is fixed to the spindle by suitable means, as the set-screws 21, 22. The upper and lower boxes 23, 24, within which the spindle is journaled are longitudinally slidable within the apertured ends of the frame 17, and are locked against rotative movement by the screws 25, 26, setting through the walls of the frame 17, their inner ends fitting within longitudinal channels, as 27, in the boxes.

The box 23 is secured against longitudinal movement relatively as to the spindle 18 by the hub of the pulley 16, against which its lower end rests, and a nut 28 screwed upon the upper end of the spindle. The box 24 is secured against longitudinal movement relatively as to the spindle 18 by means of a flange 29 on the latter, against which the lower end of the box is seated, and the hub of the pulley 16 bearing against its upper end.

The box 24 is externally threaded, as shown at 30, and carries a nut 31 having ratchet teeth 32 on its periphery, and which is rotated by means of a handle 33 fixed to a ring 34, loosely encircling the head, and having a spring pawl 35, controlled by a finger-piece 36 and coöperating with the ratchet teeth of the nut. The pawl is preferably seated within an axial socket in the handle 33, and is provided with an expansion spring 37 at the bottom of this socket. By withdrawing the pawl 35 from engagement with the teeth 32 of the nut, by pressure on the finger-piece 36, the handle may be freely oscillated without turning the nut. When the pawl is advanced into engagement with the teeth of the nut, the latter necessarily moves with the handle and thereby moves the head 24, and with it the spindle 18, up or down. The ring 34 has an annular flange 38 fitting under an internal shoulder within the chamber of the frame 17, thereby preventing movement of the handle 33, and the latter is provided with a lip 39 riding on top of the nut 31, thereby preventing upward movement and insuring longitudinal movement of the head 24 under the action of the nut.

The apertured portion of the frame 17 within which the box 24 is housed is preferably longitudinally split at one side, apertured lips 40, 41, projecting at opposite sides of the kerf and a compression screw 42 being fitted within them for controlling the pressure upon the box.

The bearings for the spindle 18, located within the boxes 23, 24, take the form of tubes, as shown at 43, 44, these tubes being longitudinally split, as shown at 45, the kerf extending from one end of the tube to within a short distance of the opposite end and terminating in a transverse kerf 50. A pair of set-screws, as 46, 47, and 48, 49, set through the walls of each of the boxes 23, 24, engaging a longitudinally split portion of the bearing and serving as means for compressing it to take up wear. The unsplit portion of the bearings is provided with an internal annular channel 51, within which is seated a ring of absorbent material, such as felt, which prevents the escape of oil.

I claim as my invention—

1. In a router head, in combination, a vertically recessed frame, a journal box longitudinally movable within the recess of the frame and being externally threaded, a nut in engagement with the box, an oscillatable handle, a pawl carried by the handle for engaging the nut, and a spindle journaled within the box and secured thereto against relative longitudinal movement.

2. In a router head, in combination, a frame having a pair of alined apertured members, journal boxes longitudinally movable within the apertures of such members, one of said boxes being externally threaded, a spindle journaled within the boxes and engaged by and secured thereto, a nut in engagement with the boxes, an oscillatable handle, and a pawl carried by the handle for engaging the nut.

3. In a router head, in combination, an apertured frame, a journal box within the aperture of the frame, a spindle journaled within the box, a lining for the box forming a bearing for the spindle, such lining being partially split from one end and having a transverse kerf meeting the inner end of the longitudinal kerf, and pressure screws setting through the walls of the box and bearing upon the longitudinally split portion of the lining.

JOHN A. PEARSON.

Witnesses:
LOUIS K. GILLSON,
E. M. KLATCHER.